(12) United States Patent
Li et al.

(10) Patent No.: US 11,180,412 B2
(45) Date of Patent: Nov. 23, 2021

(54) ALUMINATE-ENHANCED TYPE I PORTLAND CEMENTS WITH SHORT SETTING TIMES AND CEMENT BOARDS PRODUCED THEREFROM

(71) Applicant: UNITED STATES GYPSUM COMPANY, Chicago, IL (US)

(72) Inventors: Qinghua Li, Rolling Meadows, IL (US); Yanfei Peng, Hawthorn Woods, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 16/801,083

(22) Filed: Feb. 25, 2020

(65) Prior Publication Data
US 2020/0331802 A1   Oct. 22, 2020

Related U.S. Application Data

(60) Provisional application No. 62/834,997, filed on Apr. 17, 2019.

(51) Int. Cl.
| | |
|---|---|
| C04B 7/19 | (2006.01) |
| C04B 7/42 | (2006.01) |
| C04B 14/06 | (2006.01) |
| C04B 14/10 | (2006.01) |
| C04B 14/20 | (2006.01) |
| C04B 14/28 | (2006.01) |
| C04B 14/36 | (2006.01) |
| C04B 18/08 | (2006.01) |

(52) U.S. Cl.
CPC .............. C04B 7/19 (2013.01); C04B 7/424 (2013.01); C04B 7/428 (2013.01); C04B 14/06 (2013.01); C04B 14/10 (2013.01); C04B 14/20 (2013.01); C04B 14/28 (2013.01); C04B 14/365 (2013.01); C04B 18/08 (2013.01)

(58) Field of Classification Search
CPC ........... C04B 7/19; C04B 7/424; C04B 7/428; C04B 14/06; C04B 14/10; C04B 14/20; C04B 14/28; C04B 14/365; C04B 18/08
See application file for complete search history.

(56) References Cited

U.S. PATENT DOCUMENTS

| | | | |
|---|---|---|---|
| 4,450,022 A | 5/1984 | Galer | |
| 4,488,909 A | 12/1984 | Galer et al. | |
| 4,488,917 A | 12/1984 | Porter et al. | |
| 4,504,335 A | 3/1985 | Galer | |
| 4,916,004 A | 4/1990 | Ensminger et al. | |
| 5,188,889 A * | 2/1993 | Nagatomi | B32B 21/02 |
| | | | 428/304.4 |
| 6,290,769 B1 | 9/2001 | Carkner | |
| 6,641,658 B1 | 11/2003 | Dubey | |
| 6,869,474 B2 | 3/2005 | Perez-Pena et al. | |
| 7,326,478 B2 | 2/2008 | Bouscal et al. | |
| 7,670,427 B2 | 3/2010 | Perez-Pena et al. | |
| 8,038,790 B1 | 10/2011 | Dubey et al. | |
| 8,070,878 B2 | 12/2011 | Dubey | |
| 8,277,556 B2 | 10/2012 | Berke et al. | |
| 8,298,332 B2 | 10/2012 | Dubey | |
| 8,519,016 B2 | 8/2013 | Perez-Pena | |
| 9,604,879 B2 | 3/2017 | Schmitt et al. | |
| 9,624,131 B1 | 4/2017 | Dubey et al. | |
| 9,994,484 B2 | 6/2018 | Perez-Pena | |
| 10,040,725 B2 | 8/2018 | Perez-Pena | |
| 10,221,100 B2 | 3/2019 | Intorcia et al. | |
| 2005/0269730 A1 | 12/2005 | Asakura | |
| 2006/0292358 A1 | 12/2006 | Robertson et al. | |
| 2010/0068458 A1 | 3/2010 | Sakai | |
| 2019/0010092 A1 | 1/2019 | Archer et al. | |
| 2019/0382308 A1 | 12/2019 | Wang | |

FOREIGN PATENT DOCUMENTS

| | | | |
|---|---|---|---|
| CN | 105218044 A | * | 1/2016 |
| EP | 0245257 A1 | | 11/1987 |
| KR | 101794107 B1 | * | 11/2017 |
| WO | 8604376 A1 | | 7/1986 |

OTHER PUBLICATIONS

US 8,642,160 B2, 02/2014, Dubey et al. (withdrawn)
Kropp et al. "Performance Criteria for Concrete Durability"., p. 45 (Year: 1995).*
USG DUROCK® Brand Cement Board, USG Tile & Flooring Solutions, Submittal Sheet, United States Gypsum Company, 2018.
USG DUROCK® Brand Cement Board 1/4" Underlayment, USG Tile & Flooring Solutions, Submittal Sheet, United States Gypsum Company, 2018.
The Science of Concrete, Chapters 3.6 and 3.8, URL: <http://iti.northwestern.edu/cement/index.html>, retrieved from the Internet Jul. 31, 2018.
Jianguo Han ED, Harte Annette et al., "Influence of Sodium Aluminate On Cement Hydration and Concrete", Construction and Building Materials, Elsevier, Netherlands, vol. 64, Aug. 14, 2014, pp. 342-349, XP002788566.

(Continued)

*Primary Examiner* — Anthony J Green
(74) *Attorney, Agent, or Firm* — Vorys, Sater Seymour and Pease LLP; Pradip Sahu; Philip T. Petti

(57) ABSTRACT

Aqueous cementitious slurries including predominantly Type I Portland cement containing an aluminate additive. The aluminate additive is an aluminate salt other than calcium aluminate or calcium sulfoaluminate, preferably sodium aluminate. Cementitious reactive powders of the slurry include the Type I Portland cement and 0.1-10 wt. % of the aluminate additive as an accelerator. The slurries may have a set time of about 10 minutes or less. Due to the short set time, the cementitious reactive powders may facilitate cement board fabrication by continuous manufacturing processes. Methods for making cement boards may include disposing the aqueous cementitious slurry including the cementitious reactive powders in a continuous layer, preferably upon a porous support, and setting the aqueous cementitious slurry with a set time of about 10 minutes or less.

20 Claims, 2 Drawing Sheets

(56) References Cited

OTHER PUBLICATIONS

International Search Report dated Jun. 17, 2020 from International Application PCT/US2020/027894 to United States Gypsum Company filed Apr. 13, 2020.

* cited by examiner

ALUMINATE-ENHANCED TYPE I PORTLAND CEMENTS WITH SHORT SETTING TIMES AND CEMENT BOARDS PRODUCED THEREFROM

FIELD OF THE INVENTION

The present invention relates to Type I Portland cements that are enhanced with an aluminate additive, such as sodium aluminate, to afford a shortened setting time. Cement boards and methods for producing cement boards using such aluminate-enhanced Type I Portland cements are also provided herein.

BACKGROUND OF THE INVENTION

Cement board refers to a thin, reinforced concrete panel comprising a layer of cement that is typically cast between two porous supports, such as a fiberglass scrim or other highly porous material. Such cement boards are commonly used in construction as a durable and water-resistant underlayment for ceramic tile in wet areas such as bathrooms, kitchens, shower and tub areas, and the like.

Cement board may be manufactured in a continuous process during which an aqueous cementitious slurry is cast in a continuous cement layer upon a moving porous support (e.g., fiberglass scrim). After spreading of the aqueous cementitious slurry takes place, a second porous support may then deposited on top of the spread cementitious slurry. Following sufficient setting of the continuous cement layer between the porous supports, sheets of the cement board may be cut to a predetermined size. Bare cement boards lacking a top and/or bottom support are also known.

In order to support continuous processes for manufacturing cement board, aqueous cementitious slurries having a rapid set time are typically needed. The more rapid the set time, the more quickly the cement boards can be cut to size and taken off the assembly line. Excessively rapid set times are to be avoided to maintain a useful working lifetime for dispensation of a given batch of aqueous cementitious slurry.

Given the need for relatively rapid set times, conventional manufacturing processes for cement boards typically employ Type III Portland cement, rather than the more common and less expensive Type I Portland cement. ASTM C150 is used to categorize Portland cements among Types I-V. Type III Portland cement has a similar composition to Type I Portland cement, but Type III is characterized by a smaller particle size (finer grinding) and a resultant set time that is considerably shorter than attainable with Type I. In addition, Type III Portland cement may have slightly more $C_3S$ than does Type I Portland cement (see Table 1). Fineness of the cement particles in Type III Portland cement decreases the set time due to an increased cement surface area in contact with water, thereby resulting in faster hydration. Faster hydration may promote strength development during the first 7 days of curing and cause more heat to be released during the early curing period. Table 1 compares typical amounts of certain components found in Type I and Type III Portland cements. CCN is an acronym standing for "Cement Chemist Notation," which is a shorthand notation for common cement components.

TABLE 1

|  | CCN Notation | Type I (wt. %) | Type III (wt. %) |
| --- | --- | --- | --- |
| tricalcium silicate | $C_3S$ | 55 | 57 |
| dicalcium silicate | $C_2S$ | 19 | 19 |
| tricalcium aluminate | $C_3A$ | 10 | 10 |
| tetracalcium aluminoferrite | $C_4AF$ | 7 | 7 |

U.S. Pat. No. 6,869,474 to Perez-Pena et al, U.S. Pat. No. 8,298,332 to Dubey, and U.S. Pat. No. 9,994,484 to Perez-Pena disclose cementitious reactive powders containing Type I Portland cement and including fly ash or other pozzolanic materials. An alkanolamine accelerant may be present to afford decreased set times. Given the lower cost and more ready availability of Type I Portland cement, it would be desirable to utilize this type of cement in cement board manufacturing processes without excessive amounts of the alkanolamine accelerant being present.

U.S. Pat. No. 8,277,556 to Berke et al discloses a cementitious foam slurry comprising: (i) a polycarboxylate surfactant, (ii) a foam stabilizer comprising a polyvinyl alcohol, polyvinyl acetate or mixture thereof, said foam stabilizer in an amount effective to stabilize the foam; a cross-linking agent in an amount effective for cross-linking said foam stabilizer, said foam stabilizer cross-linking agent comprising a borate, a sulfate, an aluminate, or a mixture thereof; and to incorporate said components into a foamed cement article upon hardening of the cementitious foam slurry.

US 2019/0382308 to Wang discloses cementitious compositions comprising a hydraulic cementitious material, a compound selected from the group consisting of a polyhydroxy aromatic compound, a polycarboxylic acid-containing compound or a salt thereof, ascorbic acid or a salt thereof, or a combination thereof, and a particulate material or a water soluble silicate-containing material that interacts with the compound are described herein. The polyhydroxy aromatic compound can be a water soluble compound having from two to thirty hydroxyl groups. The particulate material can exhibit a particle size distribution, wherein at least about 90% by weight of the particles have a diameter of less than 2 mm. Suitable particulate materials include nanoparticles and microparticles. The cementitious compositions can be used to form building materials.

US 2019/0010092 to Archer et al discloses a method of making a liquid hardening accelerator for a hydraulic composition the method comprising: (a) adding sugar and lithium carbonate to water to form a dispersion of the lithium carbonate in a sugar solution; (b) adding aluminium sulphate to the dispersion to form a liquid hardening accelerator.

US 2010/0068458 to Sakai discloses examples of the self-hardening inorganic material include cements, such as portland cement, slag cement, alumina cement, silica cement, fly ash cement, and portland blast-furnace slag cement; cement-silica-containing substance mixtures in which silica-containing substances, such as silica sand, shirasu, silicate pigment, silica rock powder, and silica fume, are mixed with the above-mentioned cements; gypsum; and magnesium carbonate. A hardening accelerator, such as magnesium chloride, magnesium sulfate, calcium chloride, calcium sulfate, sodium aluminate, potassium aluminate, aluminum sulfate, or water glass; and a mineral powder, such as bentonite or perlite, may be added to its compositions.

It will be appreciated that this background description has been created to aid the reader, and is neither a reference to prior art nor an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

The cementitious compositions of the present invention can be used to fabricate precast concrete products, such as cement boards having excellent moisture durability for use in wet and dry locations in buildings. Precast concrete products, such as cement boards, are preferably made under conditions which facilitate rapid final setting of the cementitious compositions, such as when no indentation is identified under standard Gillmore needle testing methods discussed below. Rapid final setting may facilitate early handling following fabrication of the precast concrete product, such as in a continuous manufacturing process.

The present invention relates to cement boards formed predominantly from Type I Portland cement, as facilitated by including an aluminate additive as a set accelerator in an aqueous cementitious slurry. Methods for forming the aqueous cementitious slurry may comprise combining water, a cementitious reactive powder and an aluminate additive. The aqueous cementitious slurry may be subsequently disposed upon one or more porous supports to form a cement board. The aluminate additive is an aluminate salt other than calcium aluminate or calcium sulphoaluminate. Set times of 10 minutes or less may be realized with the present invention to facilitate continuous manufacturing processes for the cement boards.

Thus, in one aspect, the present invention provides cement boards comprising a continuous layer formed from setting of an aqueous cementitious slurry comprising predominantly Type I Portland cement and a set accelerator comprising an aluminate additive other than calcium aluminate and calcium sulphoaluminate.

Weight percentages are expressed herein on a dry weight basis relative to all solids that are present in an aqueous cementitious slurry or a cementitious reactive powder.

In particular the present invention provides a cement board comprising:
 a continuous layer formed from setting of an aqueous cementitious slurry, the aqueous cementitious slurry comprising:
  water;
  a cementitious reactive powder comprising:
   60 to 100 wt. % Type I Portland cement, and
  a set accelerator comprising an aluminate additive other than calcium aluminate or calcium sulphoaluminate, the set accelerator in an amount equal to 0.1-10 wt. % of the cementitious reactive powder.

Preferably, the cementitious reactive powder comprises a retarder and a superplasticizer.

Preferably, the continuous layer is sandwiched between two porous supports, such as a fiberglass scrim. Cement boards featuring single support and cement boards that are unsupported also reside within the scope of the present disclosure.

The amount of Type I Portland cement in the aqueous cementitious slurry ranges from 60 to 100 wt. %. Preferably, the amount of Type I Portland cement is 80 to 100 wt. %, more preferably, 80 to 100 wt. %, and even more preferably, 100 wt. % Portland cement is present. Similar amounts are present in the continuous layer formed after setting of the aqueous cementitious slurry. Preferably, Type I Portland cement is the only type of cement present in the cementitious reactive powder or aqueous cementitious slurry.

Optionally, other types of Portland cement and other different classes of cements may be combined with the predominant Type I Portland cement. A non-zero amount of Type III Portland cement may be present, up to 20 wt. %. Preferably, up to 10 wt. % Type III Portland cement may be present, and even more preferably, up to 5 wt. % Type III Portland cement may be present in the cementitious reactive powder or aqueous cementitious slurry. Preferably, there is an absence of Type III Portland cement. A non-zero amount of total Type II Portland cement and Type III Portland cement may be present, up to 20 wt. %. Preferably, up to 10 wt. % total Type II Portland cement and Type III Portland cement may be present, and even more preferably, up to 5 wt. % total Type II Portland cement and Type III Portland cement may be present in the cementitious reactive powder or aqueous cementitious slurry. Preferably there is an absence of Type II cement. Most preferably there is an absence of Type II cement and an absence of Type III cement.

The amount of the aluminate additive may range from 0.1 to 10 wt. % in the aqueous cementitious slurry. Preferably, the amount of the aluminate additive is 1-10 wt. %, and even more preferably, the amount of the aluminate additive is 5 to 10 wt. % or 2 to 8 wt. %. Similar amounts are present in the continuous layer formed after setting of the aqueous cementitious slurry.

The aluminate additives are other than calcium aluminate and calcium sulphoaluminate. The aluminate additives are inorganic compounds. Suitable aluminate additives may include one or more aluminate salts selected from ammonium aluminate, sodium aluminate, potassium aluminate, magnesium aluminate, and any combination thereof. Aluminate precursors may also be used to form the aluminate additive in situ in the aqueous cementitious slurry. Suitable aluminate precursors may include, for example, aluminum sulfate, aluminum hydroxide, boehmite (AlO(OH)), and any combination thereof. Preferably, the aluminate additive comprises sodium aluminate.

Fly ash or other pozzolanic materials may be present in the aqueous cementitious slurry or the cementitious reactive powder, but they are not required. Typically there is 0 to 30 wt. %, preferably 0 to 20 wt. %, more preferably 0 to 10 wt. % pozzolanic material. Preferably, the cementitious reactive powder is free of or substantially free of pozzolanic material other than fly ash. More preferably, the cementitious reactive powder is free of or substantially free of pozzolanic material. More preferably, the cementitious reactive powder is free of or substantially free of pozzolanic material and Type III Portland cement. Alternately, the cementitious reactive powder or the aqueous cementitious slurry comprises Class C fly ash, Class F fly ash, or any combination thereof.

Preferably, the cementitious reactive powder is free of calcium aluminate and calcium sulphoaluminate.

Up to 5 wt. % of an alkaline additive may be present in the aqueous cementitious slurry or the cementitious reactive powder. Suitable alkaline additive may include, for example, sodium hydroxide, calcium oxide, sodium monophosphate, sodium polyphosphates, and sodium trimetaphosphate (STMP).

Preferably, the cementitious reactive powder is free of calcium sulphoaluminate.

The present invention also provides methods for processing a cementitious composition to have desirably short set times. Preferably, the short set times are facilitated with the aluminate additive, which is believed to promote ettringite formation as the aqueous cementitious slurry sets. Ettringite is a calcium aluminum sulfate compound having the formula $Ca_6Al_2(SO_4)_3 \cdot 32H_2O$ or alternatively $3CaO \cdot Al_2O_3 \cdot 3CaSO_4 \cdot 32H_2O$. Ettringite forms as long needle-like crystals and provides rapid early strength upon setting. As such, cement boards featuring significant ettringite formation may be handled relatively soon after being fabricated in continuous manufacturing processes.

In particular the present invention provides a method for processing a cementitious composition, comprising:
combining water, a cementitious reactive powder, and a set accelerator to form an aqueous cementitious slurry;
wherein the cementitious reactive powder comprises:
60 to 100 wt. % Type I Portland cement, and
wherein the set accelerator comprises an aluminate additive other than calcium aluminate or calcium sulphoaluminate, the set accelerator provided in an amount equal to 0.1-10 wt. % of the cementitious reactive powder.

Further, the method for processing the cementitious composition may comprise:
disposing the aqueous cementitious slurry as an unset continuous layer; and
allowing the unset continuous layer to undergo setting to form a cement board with a desired final set time of about 10 minutes or less.

When the specification refers to setting time for compositions of this invention, unless otherwise indicated, it refers to final setting time when measured in accordance to ASTM C266-18—Standard Test Method for Time of Setting of Hydraulic-Cement Paste by Gillmore Needles test procedure.

The aqueous cementitious slurry may be disposed upon at least one support material to form a continuous layer, such that at least one of a first face or a second face of the continuous layer contacts the support material. Preferably, the aqueous cementitious slurry is disposed between two porous support materials when fabricating the cement board. The aqueous cementitious slurry may be deposited as foamed or unfoamed when being disposed as the continuous layer upon the support material(s).

The amount of Type I Portland cement in the aqueous cementitious slurry or the continuous layer formed therefrom ranges from 60 to 100 wt. %. Preferably, the amount of Type I Portland cement is 80 to 100 wt. %, more preferably 90 to 100 wt. %, and even more preferably, 100 wt. % Portland cement is present in the aqueous cementitious slurry or the continuous layer.

The amount of the aluminate additive in the aqueous cementitious slurry or the continuous layer formed therefrom may range from an amount equal to 0.1 to 10 wt. % of the cementitious reactive powder. Thus, if there are 100 parts by weight cementitious reactive powder there may be 0.1 to 10 parts by weight aluminate additive. Preferably, the amount of the aluminate additive is equal to 1-10 wt. % of the cementitious reactive powder, and even more preferably, the amount of the aluminate additive is equal to 5-10 wt. % or 2 to 8 wt. % of the cementitious reactive powder.

The aluminate additives are other than calcium aluminate and calcium sulphoaluminate. They may include one or more aluminate salts or aluminate precursors. Suitable aluminate salts may include ammonium aluminate, sodium aluminate, potassium aluminate, magnesium aluminate, and any combination thereof. Suitable aluminate precursors may include, for example, aluminum sulfate, aluminum hydroxide, boehmite (AlO(OH)), and any combination thereof. Preferably, the aluminate additive comprises sodium aluminate.

Advantages of the present invention may become apparent to one having ordinary skill in the art from a review of the following detailed description, taken in conjunction with the examples, and the appended claims. It should be noted, however, that while the invention presents in various forms, the present disclosure is intended as illustrative, and is not intended to limit the invention.

Thus, this invention generally relates to fast-setting cementitious compositions and methods for making and using the cementitious compositions. More specifically, the present invention relates to cement boards and methods for fabricating cement boards by utilizing a cementitious reactive powder also comprising an aluminate additive to promote rapid final setting and early strength attainment. Use of an aluminate additive to promote rapid setting may be advantageous compared to other set accelerators, such as alkanolamines.

DETAILED DESCRIPTION OF THE INVENTION

The present invention provides an opportunity to utilize primarily or exclusively Type I Portland cement when fabricating cement boards and similar precast concrete products. Under ordinary circumstances, Type I Portland cement does not undergo rapid enough setting for compatibility with continuous manufacturing processes for fabricating cement boards and similar precast concrete products. Desirable set times under 10 minutes may be realized by use of the present invention, thereby allowing lower-cost Type I Portland cement to be used extensively in cement boards and other types of precast concrete products.

Calcium aluminate promotes formation of ettringite, which forms as long needle-like crystals and affords rapid early strength upon setting of an aqueous cementitious slurry. Without being bound by theory or mechanism, the present invention is believed to encourage ettringite formation without utilizing calcium aluminate.

Surprisingly, combining an aluminate additive with a Type I Portland cement may provide accelerated setting of an aqueous cementitious slurry to afford set times that are compatible with continuous processes for manufacturing cement boards. Suitable aluminate additives are aluminate salts or aluminate precursors other than calcium aluminate or calcium sulphoaluminate, either type of which may be combined with a cementitious reactive powder or an aqueous cementitious slurry as a dry solid or as a liquid. Set times of 10 minutes or under may be realized in the aqueous cementitious slurries disclosed herein.

In fabricating a cement board, the aqueous cementitious slurry may be disposed as a continuous layer upon one porous support, between two porous supports or be unsupported (freestanding).

Optionally, the aqueous cementitious slurry may be foamed while being disposed as a continuous layer to form a cement board. Foaming the aqueous cementitious slurry may retain porosity within the continuous layer, thereby lowering the weight of the board to afford easier handling.

Accordingly, the present invention provides cement boards and methods for fabricating cement boards by utilizing predominantly Type I Portland cement enhanced with an aluminate additive. The aluminate additive promotes setting of an aqueous cementitious slurry with a desirable set time of 10 minutes or less. Set times under 10 minutes are rather compatible with continuous processes for manufacturing cement boards, thereby allowing lower-cost Type I Portland cements to be used extensively in cement board manufacturing processes.

Cement Board and Continuous Processes for Fabricating Cement Board

Figure 1A:
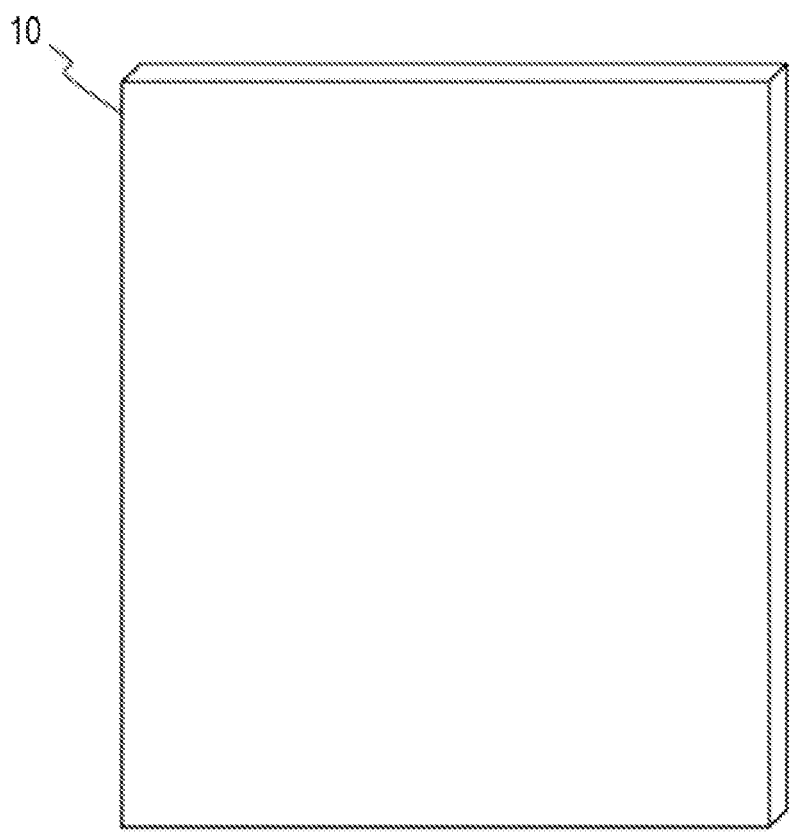
FIGS. 1A and 1B show diagrams of an illustrative cement board made according to the present invention.
Figure 1B:
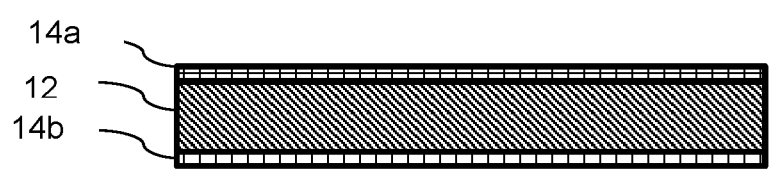

FIGS. 1A and 1B show perspective and side cross-sectional views, respectively, of cement board 10 made according to the present invention. Referring to FIG. 1B, cement board 10 may include continuous layer 12 comprising a set cementitious composition disposed between porous supports 14a and 14b. The set cementitious composition may be formed following setting of an aqueous cementitious slurry comprising an aluminate additive, as described in further detail elsewhere herein.

Figure 2:
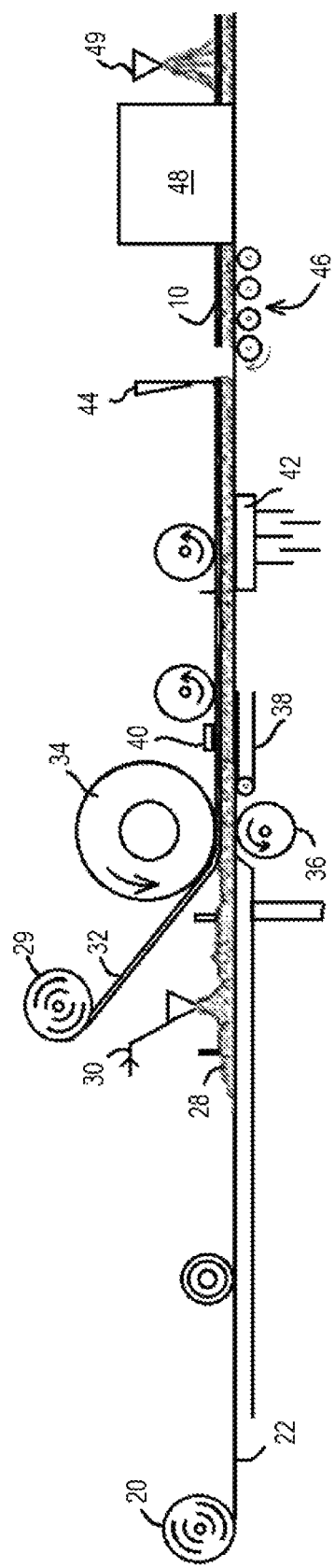
FIG. 2 shows a diagram of an illustrative apparatus that may be used for making a cement board of the present invention.

FIG. 2 shows a diagram of an illustrative apparatus that may be used for making a cement board by disposing an aqueous cementitious slurry of the invention between two porous supports. As referenced above, cement boards may alternatively comprise a single porous support or be unsupported.

Referring to FIG. 2, dry ingredients (not shown), from which continuous layer 12 is formed, are pre-mixed and then fed to mixer 30. Water and other liquid constituents (not shown) used in making continuous layer 12 are metered into mixer 30 where they are combined with the dry ingredients to form aqueous cementitious slurry 28. Foam may be induced within or introduced to mixer 30 to control the density of continuous layer 12. Aqueous cementitious slurry 28 is then dispensed onto bottom porous support 22, which is dispensed from roller 20.

Porous support 32 is fed from roller 29 onto the top of aqueous cementitious slurry 28, thereby sandwiching the slurry between the two moving porous supports to form the facings of cement board 10. The resulting sandwich structure is then passed through shaping rolls 34 and 36 and is thereafter received on conveyer belt 38. Conventional wallboard edge guiding devices 40 shape and maintain the edges of the sandwich structure until sufficient setting has taken place to retain the shape. Once the cement board is sufficiently robust for handling, sequential lengths of the board are cut by water knife 44. Individual cement board 10 is next moved along feeder rolls 46 to permit it to set further, optionally with heating in heater 48. Optionally, sprayer 49 can introduce further treatments, such as silicone oil, additional coatings, or fire retardants, to an exterior surface of the board.

Cementitious Reactive Powder and Aqueous Cementitious Slurry Components

The present disclosure provides cementitious compositions comprising predominantly or entirely Type I Portland cement and a set accelerator comprising an aluminate additive other than calcium aluminate or calcium sulphoaluminate. In particular, the present disclosure provides aqueous cementitious slurries comprising water, a cementitious reactive powder comprising 60 to 100 wt. % Type I Portland cement, and a set accelerator comprising an aluminate additive other than calcium aluminate or calcium sulphoaluminate, the set accelerator in an amount equal to 0.1-10 wt. % of the cementitious reactive powder. Advantageously, aqueous cementitious slurries of the present disclosure may feature final set times of about 10 minutes or less, thereby facilitating ready fabrication of cement boards and other cast concrete products, particularly by continuous manufacturing processes.

In the present disclosure, the amounts of the Type I Portland cement and the set accelerator comprising an aluminate additive are expressed on a dry (water free) weight basis with respect to total solids in the cementitious reactive powder or the aqueous cementitious slurry resulting therefrom. Similar amounts of the Type I Portland cement and the aluminate additive may be present in the set cementitious layer obtained following setting of the aqueous cementitious slurry. Amounts of other components in the cementitious reactive powder or the aqueous cementitious slurry are similarly expressed in terms of a dry weight basis with respect to total solids. Unless otherwise indicated, all percentages expressed herein are in weight percent.

Preferably, the amount of Type I Portland cement in the cementitious reactive powder or aqueous cementitious slurry is 80 to 100 wt. %, or more preferably 90 to 100 wt. %, or still more preferably 100 wt. %.

The amount of the aluminate additive provided in the aqueous cementitious slurry may equal 0.1 to 10 wt. % of the cementitious reactive powder. Preferably, the amount of the aluminate additive equals 1 to 10 wt. % of the cementitious reactive powder. Even more preferably, the amount of the aluminate additive equals 5 to 10 wt. % or 2 to 8 wt. % of the cementitious reactive powder. Similar amounts of the aluminate additive remain after setting of the aqueous cementitious slurry, such as when forming a continuous layer of a cement board.

The term "aluminate" refers broadly to any oxyanion of aluminum, such as $AlO_4^{5-}$, $AlO_2^-$ and $Al_2O_4^{2-}$, as well as alternative aluminum oxyanions. Preferably, the aluminate incorporated in the aqueous cementitious slurries and cementitious reactive powders of the present disclosure has a formula of $AlO_2^-$.

Suitable aluminate additives may comprise an aluminate salt selected from the group consisting of ammonium aluminate, sodium aluminate, potassium aluminate, magnesium aluminate, and any combination thereof. Preferably, the aluminate additive comprises sodium aluminate.

Alternately, an aluminate additive may be formed in situ within the aqueous cementitious slurry from an aluminate precursor. Suitable aluminate precursors may include, for example, aluminum sulfate, aluminum hydroxide, boehmite (AlO(OH)), and any combination thereof. Suitable amounts of aluminate precursors that may be present in the aqueous cementitious slurry include those necessary to form an amount of aluminate salt within the ranges specified above.

Cementitious reactive powders comprising an aluminate salt or an aluminate precursor may be combined with water to form an aqueous cementitious slurry, in which the final set time of the slurry is 10 minutes or less. As explained in U.S. Pat. No. 9,994,484 to Perez-Pena et al, incorporated herein by reference, setting of the aqueous cementitious slurry may be characterized by the initial and final set times, as specified in the ASTM C266-18 test procedure employing Gillmore needles. The final set time also corresponds to the point at which a cement-based product, such as a cement board, has hardened sufficiently so it can be handled. One having ordinary in the art will understand that curing reactions may continue for extended periods after reaching the final set time.

The final set time of the aqueous cementitious slurries disclosed herein, as measured according to the Gillmore needle test, are preferably at most 10 minutes, or more preferably at most 5 minutes. Set times may be measured after combining a cementitious reactive powder with a suitable amount of water. A shorter set time and higher early compressive strength may aid in increasing production output and lowering manufacturing costs.

According to the present disclosure, a suitable amount of water may be provided to hydrate the cementitious reactive powder and promote formation of ettringite, other hydrates of calcium aluminate compounds and/or calcium phosphate. Generally, the amount of water added is greater than theoretically required for complete hydration of the cementitious reactive powder. The increased amount of water may facilitate the workability of the aqueous cementitious slurry according to particular process needs. Suitable ratios at which the cementitious reactive powder may be combined with water to form the aqueous cementitious slurry range, on a per weight basis, from about 0.30:1 to 0.60:1, or preferably about 0.4:1 to 0.5:1.

The amount of Type I Portland cement in the cementitious reactive powder or the aqueous cementitious slurry may range from 80 to 100 wt. %. Preferably, the amount of Type I Portland cement may range from 90 to 100 wt. %. Even more preferably, 100 wt. % Portland cement is present. Thus, preferably Type I Portland cement may be the only type of cement present in the cementitious reactive powder or aqueous cementitious slurry in some cases.

The cementitious reactive powder or aqueous cementitious slurry may optionally contain minor amounts of other types of Portland cement and/or other classes of cements.

The cementitious reactive powders may comprise at most about 20 wt. % Type III Portland cement, more preferably at most about 10 wt. % Type III Portland cement, still more preferably at most about 5 wt. % Type III Portland cement. The cementitious reactive powders may comprise at most about 20 wt. % total Type II and Type III Portland cement, more preferably at most about 10 wt. % total Type II and Type III Portland cement, still more preferably at most about 5 wt. % total Type II and Type III Portland cement. Most preferably there is an absence of Type II Portland cement. Most preferably there is an absence of Type III Portland cement. Likewise, the cementitious reactive powder or aqueous cementitious slurry may feature an absence of other types of Portland cement. Preferably, the cementitious reactive powder or aqueous cementitious slurry may exhibit an absence of non-Portland cement types.

The cementitious reactive powder or aqueous cementitious slurry may optionally contain up to about 20 wt. % of a pozzolanic material, such as fly ash. Preferably, the cementitious reactive powders may contain up to about 10 wt. % of a pozzolanic material, or even more preferably up to about 5 wt. % of a pozzolanic material. If pozzolanic material is present, the cementitious reactive powders typically have a 1 wt. % minimum amount of pozzolanic material. Most typically, the cementitious reactive powders may exhibit an absence of pozzolanic material.

Alternately, the cementitious reactive powder or aqueous cementitious slurry may exhibit an absence of pozzolanic materials other than at least one fly ash. Fly ash, when present, may be included in the cementitious reactive powder or aqueous cementitious slurry in an amount up to about 20 wt. %, or more preferably up to about 10 wt. %, or still more preferably up to about 5 wt. %. Suitable fly ashes may include Class C fly ash, Class F fly ash, or any combination thereof.

More preferably, the cementitious reactive powder or the aqueous cementitious slurry may be substantially free of both pozzolanic materials and Type III Portland cement. Alternately, the cementitious reactive powder or the aqueous cementitious slurry may be substantially free of both pozzolanic materials other than fly ash and Type III Portland cement.

The cementitious reactive powders also may be substantially free of calcium sulphoaluminate cement. In the context of the present specification the term "substantially free" for any ingredient means less than 1 wt. %.

The cementitious reactive powders also may be substantially free of calcium aluminate cement.

The cementitious reactive powder or aqueous cementitious slurry of the present disclosure may further comprise up to 5 wt. % of an alkaline additive. Suitable alkaline additives may include, for example, sodium hydroxide, calcium oxide, sodium monophosphate, sodium polyphosphates, sodium trimetaphosphate (STMP), and any combination thereof.

Optional additives that may be further present in the cementitious reactive powder or aqueous cementitious slurry include, for example, sand, a mineral aggregate, a non-mineral aggregate, an accelerator, a retarder, a plasticizer, a foaming agent, gypsum, alkanolamines such as ethanolamine or triethanolamine, a polyacrylamide, potassium dichromate, a superplasticizer, a clay, mica, calcium carbonate, and any combination thereof. Other additives that may also be present in the cementitious reactive powder or aqueous cementitious slurry include one or more of, set accelerating agents, set retarding agents, shrinkage control agents, slurry viscosity modifying agents (thickeners), coloring agents and internal curing agents, may be included as desired for particular application configurations. Preferably, the cementitious reactive powder or aqueous cementitious slurry comprises at least a retarder and a superplasticizer as additional additives.

Pozzolans (Pozzolanic Material)

ASTM C618-97 defines pozzolans as a broad class of siliceous or siliceous/aluminous materials which, in themselves, possess little or no cementitious value but which, in finely divided form and in the presence of water, react chemically with calcium hydroxide at ordinary temperature to form compounds possessing cementitious properties. The quantification of the capacity of a pozzolan to react with calcium hydroxide and water is given by measuring pozzolanic activity.

Various natural and man-made materials have been referred to as pozzolanic materials possessing pozzolanic properties. Pozzolana are naturally-occurring pozzolans of volcanic origin. Other examples of pozzolanic materials suitable for use in the present disclosure include, for example, pumice, diatomaceous earth, silica fume, volcanic tuff, rice husk, metakaolin, ground granulated blast furnace slag, fly ash, vermiculite clays, calcium carbonate, and crushed mica. Any of these pozzolanic materials may be used either singularly or in combination in the cementitious reactive powder or aqueous cementitious slurry disclosed herein. The use of pozzolanic materials is not required in the present invention, but may be used, as needed, to afford improved setting times and early age compressive strength.

If pozzolanic material is present, fly ash may be a preferred pozzolanic material. Use of fly ash additives like Class C fly ash is normally limited to no more than about 10% by weight of the cementitious reactive powder. Preferably, fly ash and other pozzolanic materials are avoided altogether.

Preferably, when present, at least 50 wt. % of the pozzolanic material is fly ash, and more preferably at least 80% of the pozzolanic material is fly ash, most preferably Class C fly ash or Class F fly ash. Class C fly ash generally contains lime. Thus, when employing Class C fly ash, the cementitious reactive powder or the aqueous cementitious slurry is typically free of externally added lime. When present, at least half of the fly ash is preferably Class C fly ash. The fly ash is most preferably at least 80% Class C fly ash or at least 80% Class F fly ash.

Fly ash is not needed in the cementitious reactive powder and aqueous cementitious slurry and there may be an absence of fly ash. Fly ash may have an adverse effect on foaming and may require a significantly increased amount of air entraining agent to allow foaming to take place, if needed.

Aggregates and Mineral Fillers

As opposed to pozzolanic materials, aggregates and fillers are inert. For example, mineral additives such as fly ash, silica fume, and the like react with the Portland cement, but aggregates and fillers do not react. For example, calcium carbonate is a mineral additive which is inert and not pozzolanic. While the disclosed cementitious reactive powder and aqueous cementitious slurry may define the rapid-setting component, it will be understood by one having ordinary skill in the art that other materials may be included depending on the intended use and application.

For purposes of this specification, fillers are the fine granular materials (size <5 mm in diameter particles) such as perlite, which is lightweight filler. The term "aggregate" means fillers with relatively larger particles (size >5 mm and up to few inches in diameter particles). Preferably at least 80 wt. % of the aggregate and filler, if present, is coated perlite.

For instance, for cement board applications, it may be desirable to produce lightweight boards without unduly compromising the desired mechanical properties of the continuous layer. This objective may be achieved by adding lightweight aggregates and fillers. Examples of useful lightweight aggregates and fillers include sand, expanded forms of clay, volcanic tuff, shale, perlite, hollow ceramic spheres, hollow plastic spheres, expanded plastic beads, and the like. When producing cement boards, expanded clay and shale aggregates may be particularly useful. Expanded plastic beads and hollow plastic spheres, when used, are typically used in very small quantities by weight basis owing to their extremely low bulk density values.

Depending on the choice of lightweight aggregate or filler selected, the weight ratio of the lightweight aggregate or filler to the cementitious reactive powder may be about 1:100 to 200:100, preferably about 2:100 to 125:100. For example, for making lightweight cement boards, the weight ratio of the lightweight aggregate or filler to the cementitious reactive powder preferably may be about 2:100 to 125:100. In applications where the lightweight product feature is not critical, river sand and coarse aggregate as normally used in concrete construction may be utilized.

Aggregates or fillers employed in the present disclosure may have a closed porosity, which means an open porosity less than 0.10, preferably an open porosity less than 0.05, more preferably an open porosity less than 0.02, and most preferably an open porosity about zero. A desired open porosity range is 0.05 to 0.02. Open porosity means the "accessible void," the total amount of void space accessible from the particle surface.

Lightweight aggregate produced from materials such as expanded forms of clay, shale, or slate and produced by special processes that seal the outer surface of the particles, thereby yielding particles with closed porosity may be used herein. The closed porosity prevents the aqueous cementitious slurry from penetrating into the aggregate particle. Vermiculite and coated perlite can be used as substitutes if they are produced with closed porosity.

Preferably, the filler or aggregate, if present, is coated perlite added at a perlite to cementitious reactive powder weight ratio of 0 to 0.2:1. Preferably, a 0.05 to 0.2:1.0 weight ratio of coated perlite to cementitious reactive powder may be used. The perlite is preferably composed of particles having a median particle size of 20-60 microns in diameter. Preferably, the perlite has a particle density of less than 0.30 g/cc. Coated perlite has a coating, such as a coating of silane, siloxane, silicone or a mixture thereof, to prevent water absorption into interior pores of the perlite particles. Thus, coated perlite achieves open porosity of less than 0.10, preferably an open porosity less than 0.05, more preferably an open porosity less than 0.02, and most preferably and open porosity of zero. A desirable porosity is 0.05 to 0.02. U.S. Pat. No. 4,657,594 to Struss, incorporated by reference, describes examples of perlite coated with an amino-functional siloxane and a silicone wetting agent.

Retarders

In the present invention, a retarder may be preferably used. Suitable retarders may include at least one member of the group consisting of sodium citrate, potassium citrates, citric acid, gluconates, and mixtures thereof. Preferably, the retarder is selected from alkali metal salts of citric acid such as sodium or potassium citrate. Preferred alkali metal citrates are potassium citrates and sodium citrates and particularly tri-potassium citrate monohydrate and tri-sodium citrate monohydrate. Such retarders lead to aqueous cementitious slurries having relatively good fluidity and which do not stiffen too quickly (i.e., do not stiffen faster than 5-10 minutes after mixing at temperatures above room temperature), while achieving good early age compressive strength.

The amount of alkali metal citrates or similar retarders in the cementitious reactive powder or aqueous cementitious slurry is preferably in the range of about 1.0 to 4.5 wt. %, or more preferably about 3.0 to 4.5 wt. % on a dry solids basis.

Accelerators

Optionally inorganic set accelerators may be included in the cementitious reactive powder or aqueous cementitious slurry. Examples of such inorganic set accelerators include sodium carbonate, potassium carbonate, calcium nitrate, calcium nitrite, calcium formate, calcium acetate, calcium chloride, lithium carbonate, lithium nitrate, lithium nitrite, aluminum sulfate, polyphosphates and the like. Potassium hydroxide, sodium hydroxide and calcium chloride should be avoided when corrosion of cement board fasteners is of concern. However, the invention may have an absence of any one or more of sodium carbonate, potassium carbonate, calcium nitrate, calcium nitrite, calcium formate, calcium acetate, calcium chloride, lithium carbonate, lithium nitrate, lithium nitrite, aluminum sulfate, polyphosphates and the like. The invention may have an absence of aluminum sulfate. The invention may have an absence of lithium carbonate, aluminum sulfate, or a combination thereof. The invention may have an absence of calcium chloride, sodium silicate, or a combination thereof. The invention may have an absence of a combination of sugar and lithium carbonate.

Organic set accelerators also may be suitably used. A preferred organic set accelerator comprises an alkanolamine selected from the group consisting of triethanolamine, diethanolamine, monoethanolamine and mixtures thereof. Triethanolamine is most preferred.

The weight ratio of inorganic set accelerator to 100 parts by weight of the cementitious reactive powder typically is less than about 1.0 wt. %, and preferably less than about 0.25 wt. %.

Preferably, the cementitious reactive powders and aqueous cementitious slurries have an absence of water-soluble calcium salts as accelerators, particularly an absence of calcium chloride, calcium formate, and calcium nitrate. The term "water-soluble calcium salt" refers to a salt having a solubility in water at 20° C. of greater than 2 g/100 mL. Calcium sulfate is not a water-soluble calcium salt.

Superplasticizers

Water reducing agents (superplasticizers) are preferably employed in the cementitious reactive powders and aqueous cementitious slurries disclosed herein. Superplasticizers, also known as high range water reducers, are chemical admixtures used where well-dispersed particle suspension is required. These polymers are used as dispersants to avoid particle segregation (gravel, coarse and fine sands), and to improve the flow characteristics (rheology) within the aqueous cementitious slurries disclosed herein. Inclusion of a superplasticizer allows a reduction of the water to cement ratio, while not substantially affecting the workability of the slurry.

Superplasticizers have been broadly classified into four groups: sulphonated naphthalene formaldehyde condensate (SNF) (generally a sodium salt); sulphonated melamine formaldehyde condensate (SMF); modified lignosulfonates (MLS); and others. More recent superplasticizers include polycarboxylate compounds such as polyacrylate polymers. The superplasticizer is preferably a copolymer containing polyethylene glycol as a graft chain and carboxylic acid functionalities in the main chain such as a polycarboxylate ether. Sodium polycarboxylate-polysulphonates and sodium polyacrylates may also be used.

Preferably, the cementitious reactive powders or aqueous cementitious slurries of the present disclosure comprise a PCE superplasticizer. The term "PCE" refers to a polycarboxylate ether-based superplasticizer. Such chemicals allow for significant water reduction in the aqueous cementitious slurry because they provide negative charges which complex positive ionic species of the cement particles and promote dispersion due to electrostatic repulsion forces. Suitable PCE superplasticizers may include polycarboxylate dispersant polymers as disclosed in U.S. Pat. No. 7,767,019 to Liu et al., incorporated by reference.

However, the cementitious reactive powders or aqueous cementitious slurries of the present disclosure may have an absence of hydroxyl containing compound selected from the group consisting of a polyhydroxy aromatic compound, a polycarboxylic acid-containing compound or a salt thereof, ascorbic acid or a salt thereof, and a combination thereof. The cementitious reactive powders or aqueous cementitious slurries of the present disclosure may have an absence of polyhydroxy aromatic compound which is a polyphenol, a polyhydroxy phenol, or a combination thereof. The cementitious reactive powders or aqueous cementitious slurries of the present disclosure may have an absence of monocyclic or polycyclic polyhydroxy aromatic compound which has at least two hydroxyl groups on the aromatic ring or on at least one of the aromatic rings in a polycyclic compound. In some examples, the polyhydroxy aromatic compound can comprise 2 or more, hydroxyl groups on the aromatic ring or in the polycyclic aromatic compound.

The cementitious reactive powders or aqueous cementitious slurries of the present disclosure may have an absence of polyhydroxy aromatic compound which comprises a tannin, a proanthocyanidin, a catechol, a gallic acid, or a combination thereof. The cementitious reactive powders or aqueous cementitious slurries of the present disclosure may have an absence of ascorbic acid or a salt thereof. The cementitious reactive powders or aqueous cementitious slurries of the present disclosure may have an absence of hydroxyl containing compound having 1 or more, 2 or more, 3 or more, 4 or more, or 5 or more carboxylic acid groups, for example citric acid or a salt thereof.

The cementitious reactive powders and aqueous cementitious slurries disclosed herein preferably do not comprise an anti-foaming agent. Some commercial superplasticizers may contain antifoaming agents and may less preferred for use in the present disclosure.

Air-Entraining Agents

Optionally, one or more air entraining agents (also known as liquid foaming agents) may be added to the cementitious reactive powder or the aqueous cementitious slurry to promote air bubble (foam) formation in situ. Air entraining agents are typically surfactants used to purposely trap microscopic air bubbles in the concrete following setting. Alternatively, air entraining agents may be employed to externally produce foam (foam water), which may be used for forming the aqueous cementitious slurries disclosed herein in order to reduce the density of the product. Typically, to externally produce foam the air entraining agent, air and water are mixed to form foam in a suitable foam generating apparatus.

Polyvinyl alcohol (PVOH) can be added to the foam as a foam stabilizing agent before the foam is added to the aqueous cementitious slurry. However, the invention also includes compositions having an absence of polyvinyl alcohol, polyvinyl acetate or mixture thereof. The invention also includes compositions having an absence of a cross-linking agent for cross-linking the foam stabilizer, particularly an absence of any borates, more particularly an absence of any barium borates.

Suitable air entraining agents are surfactants, generally also known as soaps. A preferred air-entraining agent is alpha-olefin sulfonate (AOS) which is a type of anionic surfactant processed by alpha-olefin gas-phase sulfonation and continuous neutralization. Other examples of suitable air entraining/foaming agents include alkyl sulfonates, alkylbenzenesulfonates and alkyl ether sulfate oligomers, among others. Details concerning these types of foaming agents can be found in U.S. Pat. No. 5,643,510, incorporated herein by reference.

An air entraining agent (foaming agent) such as that conforming to standards as set forth in ASTM C 260 "Standard Specification for Air-Entraining Admixtures for Concrete" (Aug. 1, 2006) may be employed. Such air entraining agents are well known to one having ordinary skill in the art and are described in the Kosmatka et al "Design and Control of Concrete Mixtures," Fourteenth Edition, Portland Cement Association, specifically Chapter 8 entitled, "Air Entrained Concrete," (cited in U.S. Patent Application Publication No. 2007/0079733). Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents, sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, ABSs (alkylbenzenesulfonates), LASs (linear alkylbenzenesulfonates), alkanesulfonates, polyoxyethylene alkyl(phenyl)ethers, polyoxyethylene alkyl (phenyl)ether sulfate esters or salts thereof, polyoxyethylene alkyl(phenyl)ether phosphate esters or salts thereof, proteinic materials, alkenylsulfosuccinates, alpha-olefin-sulfonates, a sodium salt of alpha olefin sulphonate, or sodium lauryl sulphate or sulphonate and mixtures thereof. Preferred foaming agents are alpha olefin sulfonates and sodium lauryl ethoxy sulfate, namely sodium polypropoxy-polyethoxy-decyl sulfate.

Other Chemical Additives

Other chemical admixtures such as shrinkage control agents, coloring agents, viscosity modifying agents (thickeners) and internal curing agents may also be added in the cementitious reactive powders or aqueous cementitious slurries, if desired.

Setting and Compressive Strength

Setting of the aqueous cementitious slurry is characterized by initial and final set times, as measured using Gillmore needles specified in the ASTM C266 test procedure. The final set time also corresponds to the time when a concrete product, e.g., a concrete panel, has sufficiently hardened so that it can be handled or trafficked, in the case of a concrete floor or road. Relatively higher early age (3 to 5 hours) compressive strength can be an advantage for concrete material because it can withstand higher stresses without deformation. It will be understood by one having ordinary skill in the art that curing reactions may continue for extended periods after the final setting time has been reached.

Early age strength may be characterized by measuring the compressive strength after 24 hours or after 7 days of curing as specified in the ASTM C109. Achieving high early strength allows for ease of handling stacked panels.

After setting, the aqueous cementitious slurries may exhibit a compressive strength, measured 7 days after casting, of 500 psi to about 5000 psi, preferably 500 to 3000 psi, more preferably 500 to 2000 psi, and most preferably 600 to 1000 psi.

Cement Boards

Cement boards described herein may comprise:
a continuous layer formed from setting of an aqueous cementitious slurry, the aqueous cementitious slurry comprising:
water;
a cementitious reactive powder comprising:
60 to 100 wt. % Type I Portland cement, and
a set accelerator comprising an aluminate additive other than calcium aluminate or calcium sulphoaluminate, the set accelerator in an amount equal to 0.1-10 wt. % of the cementitious reactive powder.

Although any of the cementitious reactive powders or aqueous cementitious slurries disclosed herein may be utilized in fabricating cement boards, preferably the cementitious reactive powder or the aqueous cementitious slurry comprises a retarder and a superplasticizer.

Preferably, the cement boards are formed exclusively from Type I Portland cement. However, in view of the disclosure herein, it is to be understood that up to about 20 w. % of other types of cement, such as Type III Portland cement, may be present in the cementitious reactive powder. Inclusion of other cements may be performed to adjust the set time to a desired degree.

Preferably, the aluminate additive is sodium aluminate.

Preferably, the set time of the aqueous cementitious slurry is 10 minutes or less.

Manufacturing Methods

Methods for manipulating the aqueous cementitious slurries are also contemplated herein, such as for fabricating cement boards. Although cement boards may be advantageously fabricated according to the disclosure herein, it is to be appreciated that other types of precast concrete products may also be suitably fabricated.

Methods of the present disclosure may comprise:
combining water, a cementitious reactive powder and a set accelerator to form an aqueous cementitious slurry;
wherein the cementitious reactive powder comprises:
60 to 100 wt. % Type I Portland cement, and
the set accelerator comprising an aluminate additive other than calcium aluminate or calcium sulphoaluminate, the set accelerator provided in an amount equal to 0.1-10 wt. % of the cementitious reactive powder.

Further methods of the present disclosure may comprise:
disposing the aqueous cementitious slurry as an unset continuous layer; and
allowing the unset continuous layer to undergo setting to form a cement board with a final set time of about 10 minutes or less.

Precast concrete products, such as cement boards, are manufactured most efficiently in continuous processes in which the cementitious reactive powder may be blended with aggregates, fillers and other necessary ingredients, followed by addition of water and other chemical additives just prior to placing the resulting aqueous cementitious slurry in a mold or over a continuous casting and forming belt.

Due to the rapid setting characteristics of the aqueous cementitious slurries disclosed herein, it should be appreciated that the mixing of the cementitious reactive powder with water and air usually will be done just prior to the casting operation. As a consequence of the formation of the alkali aluminosilicate hydrates and/or other hydrates of aluminosilicates and/or calcium aluminosilicate compounds, the cement board becomes rigid, ready for cutting, handling and stacking for further curing. Use of the aluminate additive according to the present disclosure may promote ettringite formation to promote the rapid setting.

An attractive feature of the present disclosure is that inclusion of the aluminate additive does not compromise the ability to use existing manufacturing lines, such as those shown illustratively in FIG. 2. As such, use of the aluminate additive does not require development of special equipment and may allow cement boards to be made from predominantly Type I Portland cement at lower cost.

EXAMPLES

Example 1. Aqueous cementitious slurries were prepared as specified in Table 2 below. The cement of each Mix was one of Type I Portland cement or Type III Portland cement. Where used, the sodium aluminate was introduced as a 45 wt. % solution in water. Sodium metaphosphate is an accelerator. Naphthalene sulfonate is a plasticizer. Liquid weights in the table below represent the liquid weight introduced during formulation, not the weight of the active ingredient therein. Fluidity was rated on a relative scale, with 5 being the most workable and 1 being the least workable. The acronym TEA refers to triethanolamine. The acronym CCS refers to the 24 hour cube compressive strength. Cube compressive strength was measured in accordance with ASTM C109-16. The cubes were kept at about 65° C. after cast to mimic the elevated temperature during typical cement board manufacturing. In the examples, setting time refers to final setting time when measured in accordance to ASTM C266-18—Standard Test Method for Time of Setting of Hydraulic-Cement Paste by Gillmore Needles test procedure.

TABLE 2

|  | Mix 1 | Mix 2 | Mix 3 | Mix 4 | Mix 5 |
|---|---|---|---|---|---|
| Portland Cement Type | Type III | Type I | Type I | Type I | Type I |
| Cement Weight (g) | 305.5 | 305.5 | 305.5 | 305.5 | 305.5 |
| Class C Fly Ash (g) | 91.6 | 91.6 | 91.6 | 91.6 | 91.6 |
| Landplaster (g) | 36.7 | 36.7 | 36.7 | 36.7 | 36.7 |
| Lightweight aggregate (g) | 282 | 282 | 282 | 282 | 282 |
| Perlite (g) | 28.2 | 28.2 | 28.2 | 28.2 | 28.2 |
| Liquids Temperature (° C.) | 68 | 68 | 23 | 40 | 30 |
| Water (g) | 254.9 | 254.9 | 240.5 | 240.5 | 240.5 |
| TEA 85% (g) | 1.28 | 1.28 | 0.51 | 0.51 | 0.51 |
| sodium metaphosphate (g) | 0.87 | 0.87 | 0.87 | 0.87 | 0.87 |
| 45 wt. % Sodium Aluminate (g) | — | — | 20.4 | 20.4 | 20.4 |
| Sodium Citrate (g) | 0.87 | 0.87 | 0.87 | 1.31 | 1.74 |
| Naphthalene sulfonate plasticizer (g) | 1.63 | 1.63 | 2.17 | 1.63 | 1.63 |
| Fluidity | 5 | 5 | 2 | 2 | 3 |
| Final Set Time (min.) | 6 | >20 | >16 | 6 | 10 |
| 24 hour CCS (psi) | 1321 | 523 | 1281 | 1281 | 1206 |

Mix 1 was a control employing Type III Portland cement. The solids were present in the following relative amounts: 100 parts cement, 30 parts fly ash, and 12 parts land plaster. The ratios of Light weight aggregate and perlite to the total solids weight were 0.65 and 0.065, respectively. Triethanolamine (TEA) and sodium metaphosphate were introduced as accelerators at 0.25 wt. % and 0.2 wt. %, respectively. Sodium citrate was introduced as a retarder at 0.2 wt. %. Naphthalene sulfonate plasticizer was introduced as a plasticizer at 0.15 wt. %. The effective ratio of water to the total aqueous cementitious slurry was 0.59.

Mix 2 was the same at Mix 1 except for employing Type I Portland cement. As shown, the set time was considerably longer at 20 minutes and the compressive strength was less than 50% of the control at 523 psi.

Mixes 3-5 employed a fixed amount of sodium aluminate (2 wt. % of the total cementitious mixture). The amount of triethanolamine was lowered to 0.1 wt. % for all 3 mixes while keeping sodium metaphosphate constant. Lower liquids temperatures were used to improve fluidity.

For Mix 3, a liquids temperature of 23° C. was used in combination with an increased amount of Naphthalene sulfonate plasticizer. Fluidity was poor and rated at 2, and the set time was long at more than 16 minutes. The CCS value of 1281 psi was improved compared to the control.

For Mix 4, the liquids temperature was increased to 40° C. to reduce the set time. Sodium citrate was increased to 0.3 wt. % to improve fluidity. The fluidity stayed poor and rate at 2. However, the set time was significantly reduced to 6 minutes, similar to control mix 1. The CCS value was also similar to the control at 1281 psi.

For Mix 5, a liquids temperature of 30° C. was used and sodium citrate was increased still further to 0.4 wt. %. The fluidity was slightly better and rated at 3. However, the set time was delayed to 10 minutes. The CCS value was also similar to the control at 1206 psi.

Example 2. Aqueous cementitious slurries were prepared as specified in Table 3 below. PCE is an abbreviation for a polycarboxylate ether plasticizer. Liquid weights and fluidity are specified as in Table 2 above. CCS values in Table 3 are 72 hour values.

TABLE 3

|  | Mix 6 | Mix 7 | Mix 8 | Mix 9 | Mix 10 |
|---|---|---|---|---|---|
| Portland Cement Type | Type III | Type I | Type I | Type I | Type I |
| Cement Weight (g) | 305.5 | 305.5 | 305.5 | 305.5 | 305.5 |
| Class C Fly Ash (g) | 91.6 | 91.6 | 91.6 | 91.6 | 91.6 |
| Landplaster (g) | 36.7 | 36.7 | 36.7 | 36.7 | 36.7 |
| Light weight aggregate (g) | 282 | 282 | 282 | 282 | 282 |
| Perlite (g) | 28.2 | 28.2 | 28.2 | 28.2 | 28.2 |
| Kaolin clay (g) | — | — | — | 15.3 | — |
| Liquids Temperature (° C.) | 75 | 40 | 40 | 40 | 40 |
| Water (g) | 254.5 | 240.5 | 240.5 | 240.5 | 240.5 |
| TEA 85% (g) | 1.28 | 0.51 | 0.51 | 0.51 | 0.51 |
| Sodium metaphosphate (g) | 0.87 | 0.87 | 0.87 | 0.87 | 0.87 |
| 45 wt. % Sodium Aluminate (g) | — | 20.4 | 20.4 | 20.4 | 20.4 |
| Sodium citrate (g) | 0.87 | 0.87 | 1.31 | 1.31 | 1.31 |
| Naphthalene sulfonate plasticizer (g) | 1.63 | 1.63 | 1.63 | 1.63 | |
| PCE (g) | — | — | — | — | 3.26 |
| Fluidity | 5 | 2.5 | 3 | 3 | 4 |
| Final Set Time (min.) | 9.5 | >10 | 9 | 10 | 9 |
| 72 hour CCS (psi) | 3026 | 2548 | 2144 | 2118 | 2006 |

Mix 6 is a control employing Type III Portland cement and has a similar composition to Mix 1 specified in Example 1 above. The liquids were heated to 75° C. for accelerated setting. The fluidity was excellent and was rated at 5, and the set time was 9.5 minutes. The 3 day CCS value was 3026 psi.

Mix 7 corresponds most closely to Mix 4 in Example 1, except for employing lower sodium citrate. The fluidity was poor and rated at 2.5. Setting was also slower than for the control. The 3 day CCS was at 2548 psi, which was also lower than the control.

Mix 8 employed higher sodium citrate than Mix 7. The fluidity was slightly improved at 3, and the set time was comparable to the control at 9 minutes. The 3 day CCS value was 2144 psi, which was lower than the control.

Kaolin clay was added to Mix 9 in an attempt to improve the fluidity, while keeping all other components the same as Mix 8. The fluidity stayed the same at 3. The set time was slightly increased to 10 minutes, which is slightly longer than the control and Mix 8. The 3 day CCS was also similar to Mix 8 at 2118 psi.

Mix 10 was the same as mix 8, except that PCE plasticizer was included. The fluidity was greatly improved to 4, and the set time was 9 minutes, similar to the control. The 3 day CCS was 2006 psi, however, the lowest of the 5 mixes in this example.

Example 3. Aqueous cementitious slurries were prepared as specified in Table 4 below. CCS values in Table 4 are 72 hour values. This example was conducted to examine the effect of using lower reactivity Class F fly ash in the aqueous cementitious slurries.

TABLE 4

|  | Mix 11 | Mix 12 | Mix 13 | Mix 14 | Mix 15 | Mix 16 | Mix 17 |
|---|---|---|---|---|---|---|---|
| Portland Cement type | Type I | Type I | Type I | Type I | Type I | Type I | Type I |
| Cement weight (g) | 305.5 | 305.5 | 305.5 | 305.5 | 305.5 | 305.5 | 305.5 |
| Class C Fly Ash (g) | 45.8 | — | — | — | — | — | — |
| Class F Fly Ash (g) | 45.8 | 91.6 | 91.6 | 91.6 | 91.6 | 91.6 | 91.6 |
| Landplaster (g) | 36.7 | 36.7 | 36.7 | 36.7 | 36.7 | 36.7 | 36.7 |
| Lime (g) | — | — | 4.58 | 0.92 | — | — | — |
| Light weight aggregate (g) | 282 | 282 | 282 | 282 | 282 | 282 | 282 |
| Perlite (g) | 28.2 | 28.2 | 28.2 | 28.2 | 28.2 | 28.2 | 28.2 |
| Liquids Temperature (° C.) | 40 | 40 | 40 | 40 | 50 | 60 | 50 |
| Water (g) | 240.5 | 240.5 | 240.5 | 240.5 | 240.5 | 240.5 | 240.5 |
| TEA 85% (g) | 1.02 | 1.02 | 1.02 | 1.02 | 0.51 | 0.51 | 0.51 |
| Sodium metaphosphate (g) | 0.87 | 0.87 | 0.87 | 0.87 | 0.87 | 0.87 | 0.87 |
| 45 wt. % Sodium Aluminate (g) | 20.4 | 20.4 | 20.4 | 20.4 | 20.4 | 20.4 | 20.4 |
| Sodium Citrate (g) | 1.31 | 1.31 | 1.31 | 1.31 | 1.31 | 1.31 | 1.31 |
| PCE (g) | 3.26 | 3.26 | 3.26 | 3.26 | 3.26 | 4.22 | 3.62 |
| Fluidity | 4.5 | 5 | 1 | 4 | 4.5 | 3.5 | 4 |
| Set Time (min.) | 10 | 10 | 13 | 10 | 9 | 8 | 11 |
| 72 hr CCS (psi) | 2252 | 2389 | 1533 | 2115 | 1932 | 2140 | 1899 |

Mix 11 was most similar to Mix 10 in Example 2, except that half of the Class C fly ash was substituted with Class F fly ash. Considering the lower reactivity of Class F fly ash, a higher quantity of TEA was used. Adding using Class F fly ash slightly improved the fluidity to a value of 4.5, but the set time was slightly delayed to 10 minutes. The 3 day CCS was slightly higher (2252 psi) than in Mix 10 of Example 2, possibly due to the higher TEA content.

In Mix 12 all Class C fly ash was replaced by Class F fly ash, with all other components staying the same as in Mix 11. The fluidity was excellent and rated at 5, the same as the control of Example 2. The set time was similar to Mix 11 at 10 minutes, and the 3 day CCS value was 2389 psi, slightly higher than Mix 11.

Mixes 13 and 14 introduced extra lime as a CaO source to promote accelerated ettringite formation. 1.5 parts lime was added for Mix 13, while keeping other components the same as Mix 12. The mix was very stiff and non-workable, resulting in a fluidity rating of 1. The set time was delayed to 13 minutes, and the 3 day CCS value was reduced to 1533 psi, only 50% of the control mix with Type III cement (Mix 5 in Example 2). For Mix 14, 0.3 parts lime was added. The fluidity was good and rated at 4, and the set time was 10 minutes. The 3 day CCS was slightly lower than Mix 12 without lime (2115 psi vs. 2389 psi). As shown, extra lime was not needed to promote accelerated ettringite formation.

Mixes 15-17 examined the effect of the liquids temperature, and whether a higher liquids temperature can compensate for the effect of TEA. Mix 15 was the same as Mix 12, except that a higher liquids temperature of 50° C. was used. The fluidity was slightly reduced (4.5 vs. 5), but the set time was slightly improved (9 vs. 10 minutes). The 3 day CCS was also lower than Mix 12 (1932 vs. 2389 psi). For Mix 16, the liquids temperature was further increased to 60° C., while reducing TEA to half of Mix 12 (0.51 vs. 1.02 g) and increasing the polycarboxylate plasticizer slightly to compensate for the expected loss in fluidity with a higher liquids temperature. The fluidity was fair and valued at 3.5, and the set time was reduced to 8 minutes. The 3 day CCS was slightly lower than Mix 12 (2140 vs. 2389 psi). Mix 17 had lower TEA content (0.51 vs. 1.02 g) and the liquids temperature was kept at 50° C. The fluidity was good and valued at 4, but the set time was delayed to 11 minutes. The 3 day CCS was also lower at 1899 psi.

As shown in this example, lower reactivity Class F fly ash can be used acceptably when sodium aluminate is used to accelerate early age ettringite formation. A higher liquids temperature can be used to compensate for acceleration promoted by TEA. Moreover, extra lime is not needed to promote accelerated early age ettringite formation.

Example 4. Aqueous cementitious slurries were prepared as specified in Table 5 below to examine the effect of various mineral additives. CCS values in Table 5 are 72 hour values.

TABLE 5

|  | Mix 18 | Mix 19 | Mix 20 |
|---|---|---|---|
| Portland Cement Type | Type I | Type I | Type I |
| Cement Weight (g) | 305.5 | 305.5 | 305.5 |
| Calcium Carbonate (g) | 91.6 (mean diameter 11 microns) | 91.6 (mean diameter 3 microns) | — |
| Silica Fume (g) | — | — | 91.6 |
| Landplaster (g) | 36.7 | 36.7 | 36.7 |
| Light weight aggregate (g) | 282 | 282 | 282 |
| Perlite (g) | 28.2 | 28.2 | 28.2 |
| Liquids Temperature (° C.) | 50 | 50 | 50 |
| Water (g) | 240.5 | 240.5 | 240.5 |
| TEA 85% (g) | 1.02 | 1.02 | 0.51 |
| Sodium metaphosphate (g) | 0.87 | 0.87 | 0.87 |
| 45 wt. % Sodium Aluminate (g) | 20.4 | 20.4 | 20.4 |
| Sodium Citrate (g) | 1.31 | 1.31 | 1.31 |
| PCE (g) | 4.22 | 4.83 | 3.26 |
| Fluidity | 4.5 | 5 | 1 |
| Set time (min) | 10 | 10 | 13 |
| 72 hr CCS (psi) | 2252 | 2389 | 1533 |

Mix 18 used a coarse carbonate additive having a mean diameter of about 11 microns. The same TEA content was used (1.02 g) as in Mix 15 of Example 3. A higher PCE plasticizer loading was used (4.22 vs. 3.62 g) due to the irregular shape of calcium carbonate and the difficulty in dispersing it. The fluidity was good at and rated at 4, and the set time was 9 minutes, the same as Mix 15 in Example 3. The 3 day CCS was at 1727 psi, slightly lower than Mix 15 in Example 3. Thus, lime from cement hydration is adequate for accelerated early age ettringite formation, because calcium carbonate is inert and exhibits negligible contribution to lime in the system.

Mix 19 used a fine carbonate source having a mean diameter of about 3 microns. A higher PCE plasticizer loading was used (4.83 g) to obtain the desired fluidity. The fluidity was good and rated at 4, and the set time was even faster at 8 minutes, faster than the 9.5 minutes for a control mix with Type III Portland cement (Mix 6 in Example 2). The 3 day CCS was 1887 psi, which was comparable to Mix 15 in example 3 (1932 psi). In this case, the accelerated set time may be the result of seeding for ettringite formation provided by the very fine particles of calcium carbonate.

Mix 20 used an additive comprising a highly reactive pozzolanic material, silica fume. In Mix 20, 0.51 g of TEA was used in view of the high reactivity of silica fume. 3.62 g PCE plasticizer was used due to the spherical shape of silica fume and its tendency to lead to improved fluidity. The measured fluidity was poor and rated at 2.5, possibly due to the very high surface area of the silica fume and the need to compensate with a higher water content. The set time was excellent at 7 minutes, and the 3 day CCS was 2839 psi, similar to the strength of a control formed from Type III Portland cement (Mix 6 in Example 2).

The preceding are merely examples of the invention. It will be understood by one of ordinary skill in the art that each of these examples may be used in various combinations with the other aspects of the invention provided herein.

Clauses of the Invention

Various aspects of the present invention are described by the following clauses:

Clause 1. A cement board comprising:
a continuous layer formed from setting of an aqueous cementitious slurry, the aqueous cementitious slurry comprising:
water; and
a cementitious reactive powder comprising:
60 to 100 wt. % Type I Portland cement, and
a set accelerator comprising an aluminate additive other than calcium aluminate or calcium sulphoaluminate, the set accelerator in an amount equal to 0.1-10 wt. % of the cementitious reactive powder.

Clause 2. The cement board of clause 1, wherein the aluminate additive comprises an aluminate salt selected from the group consisting of ammonium aluminate, sodium aluminate, potassium aluminate, magnesium aluminate, and any combination thereof.

Clause 3. The cement board of clause 1, wherein the aluminate additive is formed from an aluminate precursor within the aqueous cementitious slurry, the aluminate precursor being selected from the group consisting of aluminum sulfate, aluminum hydroxide, boehmite (AlO(OH)), and any combination thereof.

Clause 4. The cement board of any one of clauses 1-3, wherein the cementitious reactive powder comprises 80 to 100 wt. % Type I Portland cement.

Clause 5. The cement board of any one of clauses 1-4, wherein the cementitious reactive powder has at most 10 wt. % Type III Portland cement.

Clause 6. The cement board of any one of clauses 1-4, wherein the cementitious reactive powder has an absence of Type III Portland cement.

Clause 7. The cement board of any one clauses 1-6, wherein the cementitious reactive powder is substantially free of calcium aluminate.

Clause 8. The cement board of any one clauses 1-7, wherein the cementitious reactive powder is substantially free of calcium sulphoaluminate.

Clause 9. The cement board of any one of clauses 1-8, wherein the cementitious reactive powder comprises 0 to 30 wt. % pozzolanic material.

Clause 10. The cement board of any preceding clause, wherein the pozzolanic material comprises Class C fly ash, Class F fly ash, or any combination thereof.

Clause 11. The cement board of any preceding clause, wherein the aqueous cementitious slurry comprises an additive selected from sand, a mineral aggregate, a non-mineral aggregate, a clay, mica, calcium carbonate, and any combination thereof.

Clause 12. The cement board of any preceding clause, wherein the cementitious reactive powder comprises up to 5 wt. % of an alkaline additive.

Clause 13. The cement board of clause 11, wherein the alkaline additive is selected from the group consisting of sodium hydroxide, calcium oxide, sodium monophosphate, sodium polyphosphates, and sodium trimetaphosphate (STMP).

Clause 14. The cement board of any preceding clause, wherein the aqueous cementitious slurry comprises an additive selected from the group consisting of an accelerator, a retarder, a plasticizer, a superplasticizer, a foaming agent, gypsum, triethanolamine, a polyacrylamide, potassium dichromate, and any combination thereof.

Clause 15. The cement board of any preceding clause, wherein Type I Portland cement is the only cement present in the cementitious reactive powder.

Clause 16. A method for processing a cementitious composition, comprising:
combining water and a cementitious reactive powder to form an aqueous cementitious slurry;
wherein the cementitious reactive powder comprises:
60 to 100 wt. % Type I Portland cement, and
a set accelerator comprising an aluminate additive other than calcium aluminate or calcium sulphoaluminate, the set accelerator provided in an amount equal to 0.1-10 wt. % of the cementitious reactive powder.

Clause 17. The method of clause 16, wherein the aluminate additive comprises an aluminate salt selected from the group consisting of ammonium aluminate, sodium aluminate, potassium aluminate, magnesium aluminate, and any combination thereof.

Clause 18. The method of clause 16, wherein the aluminate additive is formed from an aluminate precursor within the aqueous cementitious slurry, the aluminate precursor being selected from the group consisting of aluminum sulfate, aluminum hydroxide, boehmite (AlO(OH)), and any combination thereof.

Clause 19. The method of any one of clauses 16-18, wherein the cementitious reactive comprises at most 10 wt. % Type III Portland cement.

Clause 20. The method of any one of clauses 16-19, wherein the cementitious composition is free of Type III Portland cement, free of calcium aluminate, and free of calcium sulphoaluminate.

Clause 21. The method of any one of clauses 16-20, wherein the cementitious reactive powder comprises up to 5 wt. % of an alkaline additive.

Clause 22. The method of any one of clauses 16-20, wherein the cementitious reactive powder comprises a retarder and a superplasticizer.

Clause 23. The method of any one of clauses 16-20, wherein the aluminate additive is added to form the slurry as a solid.

Clause 24. The method of any one of clauses 16-20, wherein the aluminate additive is added to form the slurry as a liquid solution.

Clause 25. The method of any one of clauses 16-20, wherein Type I Portland cement is the only type of cement present in the cementitious reactive powder.

Clause 26. The method of any one of clauses 16-20, further comprising: disposing the aqueous cementitious slurry as an unset continuous layer; and
 allowing the unset continuous layer to undergo setting to form a cement board with a final set time of about 10 minutes or less.

Clause 27. The method of clause 26, wherein the cement board has a first face and a second face, and at least one of the first face and the second face contacts a porous support material.

Clause 28. The method of clause 26 or 27, wherein the aqueous cementitious slurry is foamed when disposed as the unset continuous layer.

Clause 29. The cement board of any of clauses 1-15, wherein the cementitious reactive powder has at most 10 wt. % total Type II Portland cement and Type III Portland cement.

Clause 30. The cement board of any of clauses 1-15 and 29, wherein the cementitious reactive powder has an absence of Type II Portland cement and an absence of Type III cement.

Clause 31. The cement board of any of clauses 1-15 and 29-30, wherein the cementitious reactive powder has an absence of lithium carbonate and an absence of aluminum sulfate.

Clause 32. The cement board of any of clauses 1-15 and 29-31, wherein the cementitious reactive powder has at most 20 wt. % total calcium sulfate hemihydrate and calcium sulfate dihydrate, preferably at most 10 wt. % total calcium sulfate hemihydrate and calcium sulfate dihydrate, more preferably at most 5 wt. % total calcium sulfate hemihydrate and calcium sulfate dihydrate.

Clause 33. The cement board of any of clauses 1-15 and 29-32, wherein the cementitious reactive powder has an absence of calcium sulfate hemihydrate and an absence of calcium sulfate dihydrate.

Clause 34. The cement board of any of clauses 1-15 and 29-33, wherein the cementitious reactive powder has an absence of sodium citrate, an absence of potassium citrate.

Clause 35. The cement board of any of clauses 1-15 and 29-34, wherein the cementitious reactive powder has an absence of triethanol amine.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. "Bonding relation" does not mean that two layers are in direct contact. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Unless otherwise indicated, all percentages, ratios, and average molecular weights are on a weight basis.

What is claimed is the following:

1. A cement board comprising:
 only one continuous layer formed from setting of an aqueous cementitious slurry,
 wherein the aqueous cementitious slurry comprises:
 water; and
 a cementitious reactive powder comprising:
  80 to 100 wt. % Type I Portland cement,
   wherein the cementitious reactive powder is substantially free of calcium sulfoaluminate cement and is substantially free of calcium aluminate cement,
  optionally up to 20 wt. % pozzolanic material, and
 a set accelerator comprising an aluminate additive other than calcium aluminate or calcium sulphoaluminate, the set accelerator in an amount equal to 0.1-10 wt. % of the cementitious reactive powder, wherein the aluminate additive comprises an aluminate salt selected from ammonium aluminate, sodium aluminate, potassium aluminate, magnesium aluminate, and any combination thereof, or an aluminate precursor selected from aluminum hydroxide, boehmite (AlO(OH)), and any combination thereof; and
 wherein the slurry has an absence of non-mineral aggregate,
 wherein all filler of the slurry consists of mineral filler,
 wherein the slurry has an absence of hollow plastic spheres and wherein the slurry has an absence of expanded plastic beads;
 wherein the cementitious reactive powder has an absence of aluminum sulfate.

2. The cement board of claim 1, wherein the aluminate additive comprises an aluminate salt selected from the group consisting of ammonium aluminate, sodium aluminate, potassium aluminate, magnesium aluminate, and any combination thereof.

3. The cement board of claim 1, wherein the aluminate additive is formed from an aluminate precursor within the aqueous cementitious slurry, the aluminate precursor being selected from the group consisting of aluminum hydroxide, boehmite (AlO(OH)), and any combination thereof.

4. The cement board of claim 1, wherein the cementitious reactive powder has at most 10 wt. % total Type II Portland cement and Type III Portland cement.

5. The cement board of claim 1, wherein the cement board consists of the continuous layer as a core layer, and optionally at least one facing sheet of fiberglass scrim on the continuous core layer.

6. The cement board of claim 1, wherein the cementitious reactive powder has an absence of Type II Portland cement and an absence of Type III cement,
wherein the aluminate additive is sodium aluminate in an amount that is effective to realize a set time for the aqueous cementitious slurry of 10 minutes or less,
wherein the mineral filler and mineral aggregate, if present, consists of vermiculite and/or coated perlite with less than 0.10 open porosity.

7. The cement board of claim 1, wherein the cementitious reactive powder has an absence of barium borate, and has an absence of polyvinyl alcohol, an absence of polyvinyl alcohol polyvinyl acetate, has an absence of a polyhydroxy aromatic compound, has an absence of polycarboxylic acid-containing compound, has an absence of a salt of polycarboxylic acid-containing compound, has an absence of ascorbic acid, has an absence of salt of ascorbic acid, has an absence of lithium carbonate, and has an absence of aluminum sulfate.

8. The cement board of claim 1, wherein the cementitious reactive powder comprises 0 to 30 wt. % pozzolanic material, wherein at least 80 wt. % of the aggregate and filler is coated perlite.

9. The cement board of claim 8, wherein the pozzolanic material comprises Class C fly ash, Class F fly ash, or any combination thereof.

10. The cement board of claim 1, wherein the aqueous cementitious slurry comprises an additive selected from sand, a mineral aggregate, a non-mineral aggregate, a clay, mica, calcium carbonate, and any combination thereof.

11. The cement board of claim 1, wherein the cementitious reactive powder comprises up to 5 wt. % of an alkaline additive and comprises calcium carbonate.

12. The cement board of claim 11, wherein the alkaline additive is selected from the group consisting of sodium hydroxide, calcium oxide, sodium monophosphate, sodium polyphosphates, and sodium trimetaphosphate (STMP).

13. The cement board of claim 1, wherein the aqueous cementitious slurry comprises an additive selected from the group consisting of a second accelerator, a retarder, a plasticizer, a superplasticizer, a foaming agent, gypsum, triethanolamine, a polyacrylamide, potassium dichromate, and any combination thereof.

14. The cement board of claim 1, wherein Type I Portland cement is the only cement present in the cementitious reactive powder, wherein the slurry has an absence of calcium carbonate.

15. A method for processing a cementitious composition to make a cement board according to claim 1, comprising:
combining water and a cementitious reactive powder to form an aqueous cementitious slurry;
wherein the cementitious reactive powder comprises:
80 to 100 wt. % Type I Portland cement,
wherein the cementitious reactive powder is substantially free of calcium sulfoaluminate cement and is substantially free of calcium aluminate cement,
optionally up to 20 wt. % pozzolanic material, and
a set accelerator comprising an aluminate additive other than calcium aluminate or calcium sulphoaluminate, the set accelerator provided in an amount equal to 0.1-10 wt. % of the cementitious reactive powder,
wherein the aluminate additive comprises an aluminate salt selected from the group consisting of ammonium aluminate, sodium aluminate, potassium aluminate, magnesium aluminate, and any combination thereof, or an aluminate precursor selected from the group consisting of aluminum hydroxide, boehmite (AlO(OH)), and any combination thereof; and
wherein the slurry has an absence of non-mineral aggregate,
wherein all filler of the slurry consists of mineral filler,
wherein the slurry has an absence of hollow plastic spheres and wherein the slurry has an absence of expanded plastic beads;
wherein the cementitious reactive powder has an absence of aluminum sulfate.

16. The method of claim 15, wherein the aluminate additive comprises an aluminate salt selected from the group consisting of ammonium aluminate, sodium aluminate, potassium aluminate, magnesium aluminate, and any combination thereof.

17. The method of claim 15, wherein the aluminate additive is formed from an aluminate precursor within the aqueous cementitious slurry, the aluminate precursor being selected from the group consisting of aluminum hydroxide, boehmite (AlO(OH)), and any combination thereof.

18. The method of claim 15, wherein the cementitious composition is free of Type III Portland cement, free of Type II Portland cement, free of calcium aluminate, and free of calcium sulphoaluminate, wherein the aluminate additive is sodium aluminate in an amount that is effective to realize a set time for the aqueous cementitious slurry of 10 minutes or less.

19. The method of claim 15, wherein the cementitious reactive powder comprises up to 5 wt. % of an alkaline additive.

20. A cement board consisting of:
only one continuous layer formed from setting of an aqueous cementitious slurry,
optionally the continuous layer is sandwiched between two porous supports of fiberglass scrim;
wherein the aqueous cementitious slurry consists of:
water; and
a cementitious reactive powder comprising:
80 to 100 wt. % Type I Portland cement,
wherein the cementitious reactive powder is substantially free of calcium sulfoaluminate cement and is substantially free of calcium aluminate cement,
optionally up to 20 wt. % pozzolanic material, and
a set accelerator comprising an aluminate additive other than calcium aluminate or calcium sulphoaluminate, the set accelerator in an amount equal to 0.1-10 wt. % of the cementitious reactive powder, wherein the aluminate additive comprises an aluminate salt selected from the group consisting of ammonium aluminate, sodium aluminate, potassium aluminate, magnesium aluminate, and any combination thereof, or an aluminate precursor selected from the group consisting of aluminum hydroxide, boehmite (AlO(OH)), and any combination thereof; and wherein the slurry has an absence of non-mineral aggregate, wherein all filler of the slurry consists of mineral filler, wherein the slurry has an absence of hollow plastic spheres and wherein the slurry has an absence of expanded plastic beads;

wherein the cementitious reactive powder has an absence of aluminum sulfate, optionally mineral filler, mineral aggregate, a retarder, a plasticizer, a foaming agent, gypsum, polyacrylamide, potassium dichromate, superplasticizer, clay, mica, thickeners, coloring agents, optionally inorganic set accelerator selected from sodium carbonate, potassium carbonate, calcium nitrate, calcium nitrite, calcium formate, calcium acetate, calcium chloride, lithium carbonate, lithium nitrate, lithium nitrite, polyphosphates, optionally organic set accelerator selected from triethanolamine, diethanolamine, monoethanolamine and mixtures thereof.

\* \* \* \* \*